United States Patent [19]

Keys

[11] Patent Number: 4,951,418
[45] Date of Patent: Aug. 28, 1990

[54] GLASS RUN MOLDING

[75] Inventor: James F. Keys, Port Clinton, Ohio

[73] Assignee: The Standard Products Company, Cleveland, Ohio

[21] Appl. No.: 483,323

[22] Filed: Feb. 20, 1990

Related U.S. Application Data

[63] Continuation of Ser. No. 178,141, Apr. 6, 1988, abandoned.

[51] Int. Cl.⁵ .............................................. E06B 7/16
[52] U.S. Cl. ..................................... 49/440; 49/497; 49/490
[58] Field of Search ................ 49/440, 441, 485, 490, 49/491, 497, 498

[56] References Cited

U.S. PATENT DOCUMENTS

| | | |
|---|---|---|
| 4,409,756 | 10/1983 | Audenino .............................. 49/490 |
| 4,455,785 | 6/1984 | Wahr . |
| 4,457,111 | 7/1984 | Koike . |
| 4,562,676 | 1/1986 | Krushwitz . |
| 4,783,931 | 11/1988 | Kirkwood ............................ 49/491 |
| 4,800,681 | 1/1989 | Skillen et al. ....................... 49/441 |
| 4,843,763 | 7/1989 | Mesnel ................................. 49/491 |

FOREIGN PATENT DOCUMENTS

| | | |
|---|---|---|
| 161685 | 5/1985 | European Pat. Off. . |
| 241264 | 4/1987 | European Pat. Off. . |
| 267073 | 11/1988 | European Pat. Off. . |
| 2585799 | 2/1987 | France . |
| 2140065 | 11/1984 | United Kingdom .................. 49/490 |
| 2140067 | 11/1984 | United Kingdom .................. 49/490 |
| 2145142 | 3/1985 | United Kingdom . |
| 2188082 | 9/1987 | United Kingdom . |
| 2190124 | 11/1987 | United Kingdom . |

Primary Examiner—Kenneth J. Dorner
Assistant Examiner—Gerald A. Anderson
Attorney, Agent, or Firm—Harness, Dickey & Pierce

[57] ABSTRACT

A glass run channel molding for automobile windows has a "U"-shaped cross-section portion and an "L"-shaped cross-section portion which cooperate to form a mounting channel and a glass run channel. A tubular biasing and sealing element is disposed in the glass run channel to bias a window edge against an opposing leg of the glass run channel.

7 Claims, 1 Drawing Sheet

GLASS RUN MOLDING

This is a continuation of U.S. patent application Ser. No. 07/178,141), filed Apr. 6, 1988, entitled "Glass Run Molding", now abandoned.

BACKGROUND AND SUMMARY OF THE INVENTION

The present invention relates to automotive windows and more particularly, to glass run channel molding for sealing a movable window pane in the window of a door of an automobile.

A common feature of automobile doors is a glass windowpane which can be raised and lowered. Conventionally, the windowpane follows a generally vertically extending glass run channel defined by a channel shaped molding within the door frame and the top edge of the pane engages a generally horizontally extending leg of the glass run channel. The glass run channel is normally lined with flocking or other low friction material which allows the glass pane to slide therein. The glass run channel also protects the pane from damage due to vibration and seals the edges of the pane.

In the most common types of movable automotive windows, the edges of the windowpane are centered in the side and top glass run channel legs with the plane of the outer surface of the pane noticeably offset from the plane of the outer skin surface of the automobile body. However, this arrangement detracts from the overall appearance of the automotive vehicle and disrupts the laminar flow of air around the vehicle body, resulting in unnecessary aerodynamic drag and unpleasant noise. Recently, there has been increasing interest in the automotive industry for vehicles with window panes having outer surfaces which are coplanar or almost coplanar with adjacent vehicle body surfaces. This arrangement is generally referred to as "flush" glass or "semi-flush" glass and is desirable for enhancing vehicle appearance and laminar airflow thereby reducing aerodynamic drag and wind noise.

Several patents disclose the feature of providing a window which is flush or nearly flush with adjacent vehicle body surfaces. Examples of such patents include: U.S. Pat. No. 4,409,756, Oct. 18, 1983 to Audenina, et al.; U.S. Pat. No. 4,562,676, Jan. 7, 1986 to Kruschwitz; U.S. Pat. No. 4,455,785, June 26, 1984 to Wahr, et al.; and U.S. Pat. No. 4,457,111, July 3, 1984 to Koike.

Although flush and semi-flush glass run channel moldings are known, there remains a need for improved glass run channel moldings. Glass run channel moldings must securely retain the window pane while allowing the pane to slide easily in the channel during its raising and lowering. Glass run channels must also seal the interior of the car against noise and weather and minimize window vibration. Glass run channel moldings are also desirably inexpensive to manufacture and easily installed during manufacture of the vehicle. Accordingly, the present invention relates to an improved glass run channel directed to meet the above requirements.

The new and improved glass run channel molding of the present invention includes a support structure having, in cross-section, a "U"-shaped portion and an "L"-shaped portion. The "U"-shaped and "L"-shaped portions combine to define two channels with open ends facing in opposite directions. The "U"-shaped portion defines a channel adapted to secure the glass run channel to a flange on an automobile. A resilient member on the "U"-shaped portion enhances the securing of the glass run channel to the flange. The "L"-shaped portion, in combination with one leg of the "U"-shaped portion defines a channel adapted to slidingly receive a window edge portion. A hollow tubular sealing member with at least one projecting member in the glass run channel is adapted to bias a glass edge portion into sealing engagement against the outer leg of the glass run channel.

Further understanding of the present invention will be had from the following description and claims taken in conjunction with the accompanying drawings.

DETAILED DESCRIPTION OF THE PREFERRED EMBODIMENT

Figure 1:
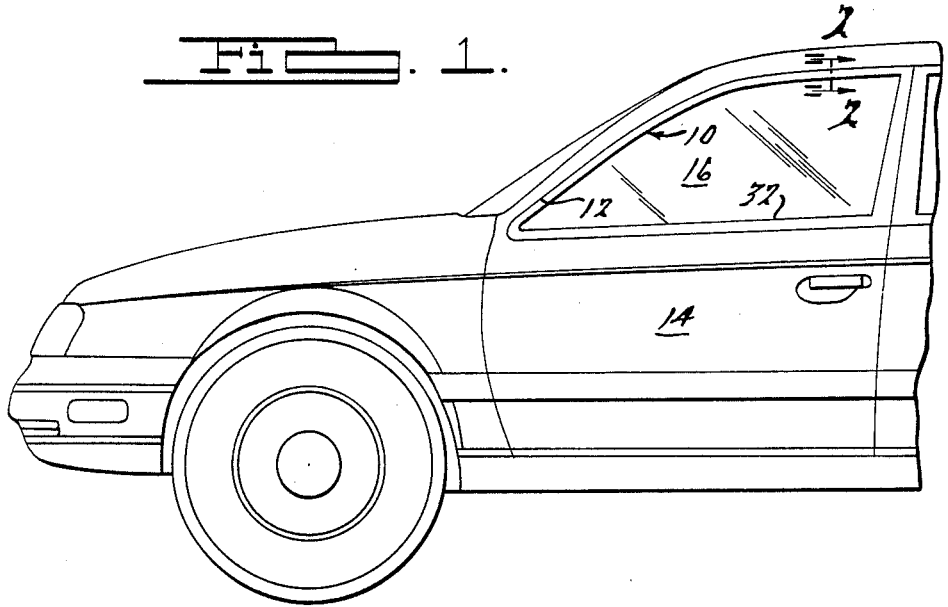
FIG. 1 is a side elevation, broken away, of an automotive vehicle on which a glass run channel molding of the present invention is assembled.

Now referring to the figures, a glass run channel molding of the present invention is shown and indicated generally by the numeral 10. As illustrated in FIG. 1, glass run channel molding 10 extends around the top and side of window opening 12 in door 14 of an automotive vehicle having a movable windowpane 16.

Figure 2:
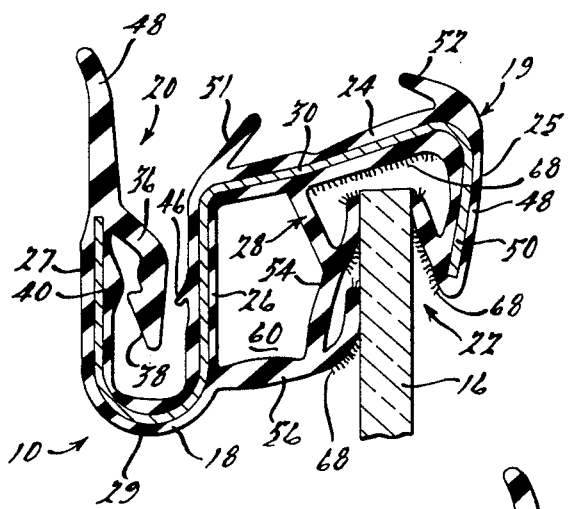
FIG. 2 is a cross-sectional view taken along line 2—2 of FIG. 1 with the door flange not shown.
Figure 3:
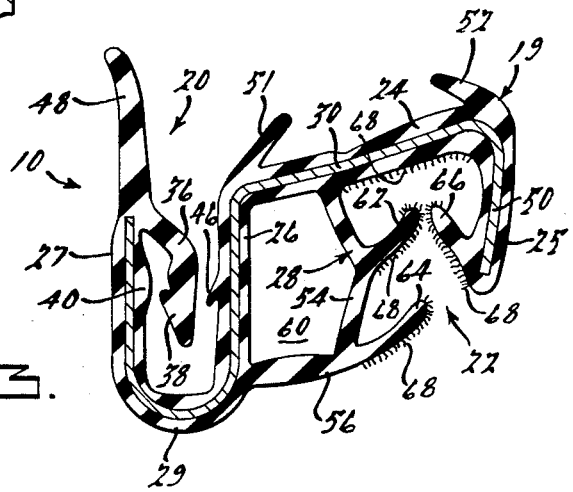
FIG. 3 is a cross-sectional view similar to FIG. 2 but showing the glass run channel molding without a windowpane.

As best shown in FIGS. 2 and 3, glass run channel molding 10 generally includes, in cross-section a "U"-shaped portion 18 and an "L"-shaped portion 19. "U"-shaped portio 18 defines a mounting channel 20 for mounting glass run channel 10 on a flange of door 14. A glass run channel 22 is defined by interior leg 26 of "U"-shaped portion 18 in conjunction with "L"-shaped cross-section portion 19, having leg 24 extending from interior leg 26 and leg 25 extending at a generally right angle from leg 24. Located within glass run channel 22 is a hollow tubular sealing and biasing member 28 for sealing windowpane 16 within channel 22 and for biasing windowpane 16 outboard towards leg 25 so that the plane of the outer surface of window pane 16 is flush or nearly flush with the adjacent vehicle panel.

While "U"-shaped portion 18 and "L"-shaped portion 19 of molding 10 are described individually hereinafter, it will be appreciated by those skilled in the art that a unitary, one piece construction of molding 10 is preferred as is illustrated in the figures. Generally "U"-shaped portion 18 and "L"-shaped portion 19 have a reinforcing single metallic core 30 which is covered by a conventional elastomeric material. For some uses core 30 may not be necessary or only a partial core 30 may be necessary. Core 30 generally has a shape in side elevation which is configured to fit within window opening 12 on all sides except bottom horizontal side 32 which must be open to allow windowpane 16 to extend therethrough. Any conventional sealing strip can be employed along edge 32 in combination with molding 10 of this invention.

The "U"-shaped cross-section mounting portion 18 generally provides mounting means for attaching molding 10 to a flange of the door frame 12. Thus, "U"-shaped portion 18 has legs 26 and 27 joined by web portion 29 which provide channel 20 for attachment of mounting portion 18 to a flange. A large rib 36 extends inwardly from leg 27 into channel 20 and has an arrow-shaped head portion 38 which cooperates with protrusion 40 to facilitate easy attachment of channel 20 to a flange but resistance to removal of channel 20 therefrom. In opposition to rib 36 is protrusion 46 on inner leg 26. Rib 36 and protrusion 40 are shown on leg 27 of mounting portion 18 but alternatively could be on inner leg 26 with opposing protrusions 46 on leg 27. Extending outwardly from the mouth of channel 20 are a pair of sealing lips 48 and 51 which are intended to sealingly engage the associated door opening.

Glass run channel 22 is defined by "L"-shaped portion 19 in combination with inner leg 26 of "U"-shaped portion 18. Outboard leg 25 of "L"-shaped portion 19 is adapted to retain the edge of glass pane 16 received in glass run channel 22. Leg 50 of core 30 extends almost the length of leg 25 to ensure retention of glass pane 16 in channel 22. Lip 52 extends from the closed end of channel 22 to provide further sealing of molding 10 with respect to the door opening.

It is important that a flush glass structural arrangement retain easy slidability of windowpane 16 in glass run channel 22. It is also important that a good seal be maintained between molding 10 and glass pane 16 when glass pane 16 is in a closed position. Thus, a tubular biasing and sealing element 28 is provided. Tubular element 28 has a side wall 54 joined to a lateral wall 56 which in turn is joined to inner leg 26 of "U"-shaped portion 18. Side wall 54 is joined to leg 24 of "L"-shaped portion 19 intermediate the ends thereof. Tubular element 28 has a hollow interior 60. Side wall 54 of biasing and sealing element 28 has a pair of ribs 62 and 64 extending inwardly into channel 22. In opposition to ribs 62 and 64 is rib 66 extending inwardly into channel 22 from leg 25. Ribs 62, 64 and 66 preferably carry flocking 68 or other low friction material on their surfaces coming into contact with glass pane 16. Tubular element 28 has a somewhat pentagonal cross-sectional shape for enhancing the sealing of the windowpane 16 in channel 22 and serves well to bias window pane 16 outboard to provide a flush or nearly flush glass arrangement.

While the above illustrates and describes a preferred embodiment of the present invention, it will become apparent to those skilled in the art that modifications, variations, and alterations may be made without deviating from the scope in fair meaning of the subjoined claims.

What is claimed is:

1. A glass run channel molding for an automobile window comprising:
   a "U"-shaped cross-section portion forming a mounting channel;
   an "L"-shaped cross-section portion, one end of said "L"-shaped portion extending from an end of one leg of said "U"-shaped portion to form a glass run channel having inner and outer legs joined by a web, said inner leg being a leg of said mounting channel, said mounting channel and glass run channel having open mouths facing in opposite directions, at least one elastomeric rib extends from the outer leg of said glass run channel into said glass run channel toward said tubular biasing and sealing element;
   sealing member for sealing said molding with respect to an associated door frame, said sealing member extending from said L-shaped cross-section portion on a said opposite said opening; and
   a tubular elastomeric biasing and sealing element secured in said glass run channel for sealing a window in said glass run channel and for biasing an edge portion of said window outwardly against the elastomeric rib on the outer leg of said glass run channel, said tubular element having a first wall joined intermediate said web of said glass run channel, a second wall joined to said second leg of said glass run channel, a third wall contiguous with a portion of said web, and a fourth wall contiguous with one leg of said "U"-shaped channel, said tubular biasing and sealing element having a pair of elastomeric ribs extending from said first wall into said glass run channel such that said elastomeric ribs extending from said outer leg and tubular biasing and sealing element oppose one another.

2. The glass run channel molding according to claim 1 wherein said tubular biasing and sealing element has a generally pentagonal cross-sectional shape.

3. The glass run channel molding according to claim 1 wherein said molding has an inner metallic core covered with an elastomeric material.

4. A glass run channel molding for an automobile window comprising:
   an elongated strip having a reinforcement member surrounded by an integral skin, said reinforcement member having in cross-section a U-shaped portion having two legs joined by a web for mounting the molding and an L-shaped portion having a long and short leg, the long leg of the L-shaped portion extending from a free end of one of the legs of the U-shaped portion such that the short leg of the L-shaped portion extends in an opposite direction of the legs of the "U" so that the L-shaped portion forms a glass run channel with one of the legs of the U-shaped portion;
   a tubular elastomeric biasing and sealing element secured in said glass run channel for sealing a window in said glass run channel and for biasing an edge portion of said window outwardly against an elastomeric rib on the short "L" leg of said glass run channel, said tubular element having a first wall joined intermediate said long "L" leg of said glass run channel, a second wall joined to one leg of said U-shaped portion of said glass run channel, a third wall contiguous with a portion of said long "L" leg, and a fourth wall contiguous with said one leg of said U-shaped portion, said tubular biasing and sealing element having a pair of elastomeric ribs extending from said first wall into said glass run channel such that said elastomeric ribs extending from said short "L" leg and said tubular biasing and sealing element oppose one another; and
   a pair of sealing members for sealing said molding with respect to an associated door frame, said pair of sealing members extending from said opposite ends of the long leg of the L-shaped cross-section portion on a side opposite said glass run channel.

5. The molding according to claim 4 wherein said tubular elastomeric biasing and sealing means has a fifth wall.

6. The molding according to claim 5 wherein said walls form an over all pentagonal shape in cross-section.

7. The molding according to claim 6 wherein said pair of ribs on said tubular member extend from a pair of apexes of said pentagon.

* * * * *

UNITED STATES PATENT AND TRADEMARK OFFICE
CERTIFICATE OF CORRECTION

PATENT NO. : 4,951,418

DATED : August 28, 1990

INVENTOR(S) : James F. Keys

It is certified that error appears in the above-identified patent and that said Letters Patent is hereby corrected as shown below:

Column 1, line 5, "07/178,141)" should be --07/178,141--.

Column 2, line 37, "portio" should be --portion--.

Column 4, line 2, "said" first occurrence should be --side--.

Signed and Sealed this

Twenty-third Day of June, 1992

Attest:

DOUGLAS B. COMER

*Attesting Officer*          *Acting Commissioner of Patents and Trademarks*